C. F. HURLBUT.
MOTOR CYCLE CLUTCH.
APPLICATION FILED JAN. 11, 1913.
1,099,651.
Patented June 9, 1914.
2 SHEETS—SHEET 2.
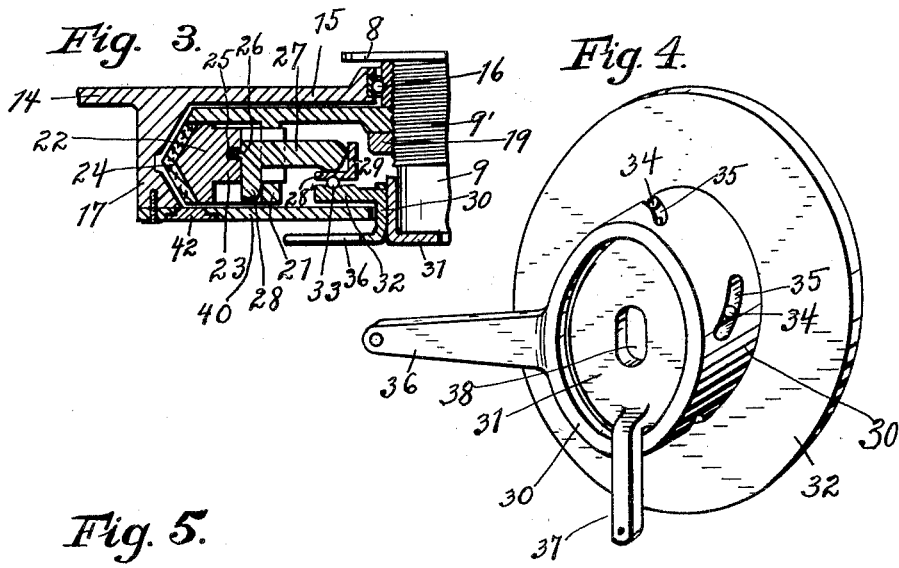
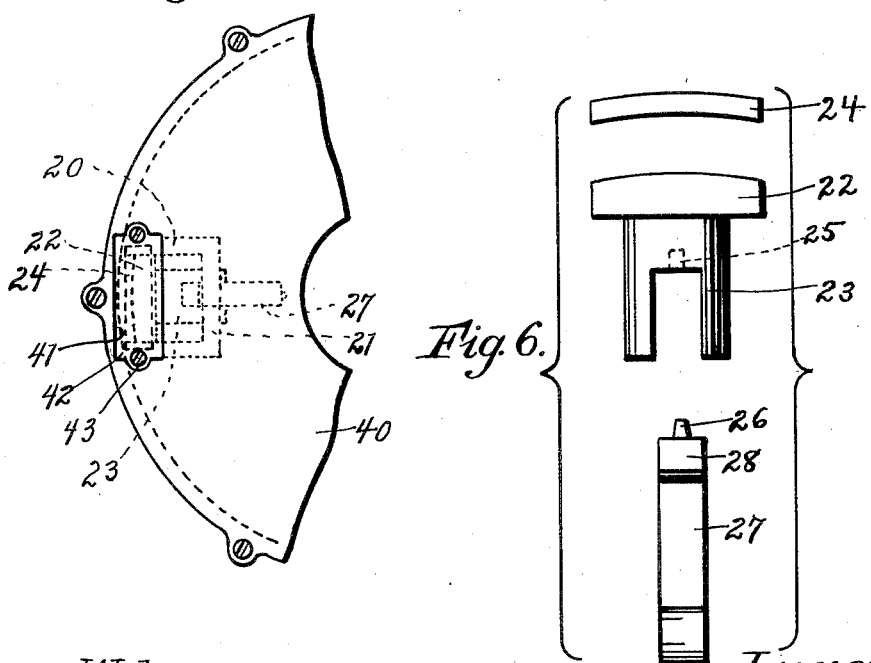
Witnesses:
T. Colson
B. J. Richards
Inventor:
Charles Floyd Hurlbut,
By Joshua R. H. Potts
his Attorney.

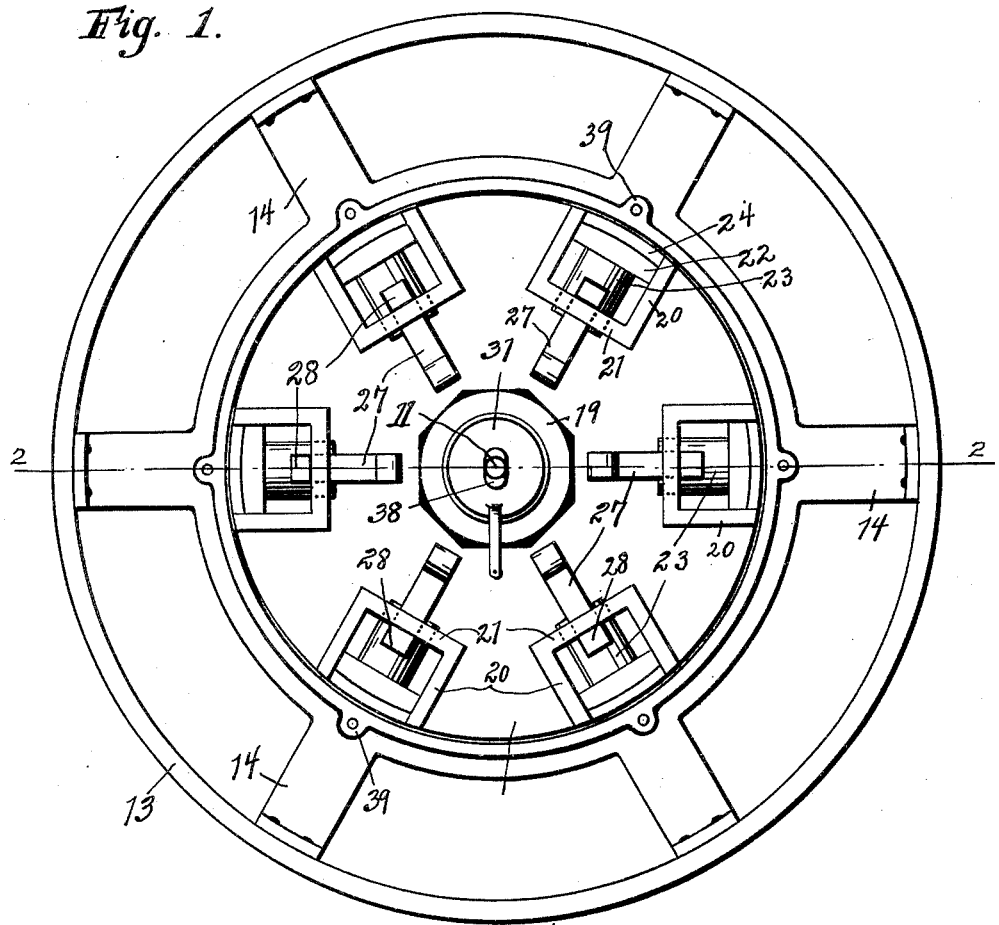

UNITED STATES PATENT OFFICE.

CHARLES FLOYD HURLBUT, OF OAK PARK, ILLINOIS.

MOTOR-CYCLE CLUTCH.

1,099,651.  Specification of Letters Patent.  Patented June 9, 1914.

Application filed January 11, 1913. Serial No. 741,419.

*To all whom it may concern:*

Be it known that I, CHARLES FLOYD HURLBUT, a citizen of the United States, and a resident of the city of Oak Park, county of Cook, and State of Illinois, have invented certain new and useful Improvements in Motor-Cycle Clutches, of which the following is a specification.

My invention relates to improvements in driving clutches and particularly to such clutches which are used in the operation of motor cycles and the like.

The object of this improvement is to provide a device of this character which will be simple in its construction and efficient in its operation.

Other objects will appear hereinafter.

The invention consists in the combinations and arrangements of parts hereinafter described and claimed.

The invention will be best understood by reference to the accompanying drawings forming a part of this specification, and in which—

Figure 1 is an elevation of a portion of a clutch embodying my invention, Fig. 2 is a section taken on line 2—2 in Fig. 1 and taken as through the complete clutch, Fig. 3 is a broken fragmental section of the same showing a modified form of the friction surface, Fig. 4 is an enlarged view, in perspective, of two of the members used in actuating the clutch, Fig. 5 is a fragmental elevation of the housing on the driving member, and Fig. 6 is an enlarged elevation showing a friction shoe and operating members used in the construction.

The preferred form of construction as illustrated in the accompanying drawings comprises a hub 7 of a conventional motor cycle wheel having the ordinary flange 8 adapted to receive the spokes of the wheel, not shown, and provided with an extension 9 a portion of which is threaded as at 9′. The rear end portion 10 of the cycle frame is secured to the hub by means of the conventional spindle 11 and nut 12.

The clutch comprises a driving member and a driven member. Said driving member being made up of a grooved flange 13 mounted on the spokes 14 of a hub 15 and said hub 15 is rotatively mounted on a ball bearing 16 which is carried by the cycle hub 9. The hub 15 is provided with a friction member 17 which is adapted to be engaged by the driven member.

The driven member is made up of a hub 18 threaded on the portion 9′ and locked thereon by a lock-nut 19 to rotate with the cycle hub 9. Formed on the hub 18 are pairs of guides 20, each pair of which are joined by a portion 21 forming substantially U-shaped guide members and provided with a perforation through said portion 21. A head 22 is mounted to slide between each pair of guides 20 and is provided with a shank 23 slidably mounted in the perforation through the corresponding portion 21. Each of the shanks 23 is bifurcated, see particularly Fig. 6, and provided with a recess 25, as clearly shown, to receive a conical projection 6 on one of the L-shaped or bent levers 27. The projections 26 and recesses 25 serve as floating pivotal points upon which the bent levers 27 swing and also coact with the arm 28 of said bent levers to maintain said bent levers in position between the bifurcated ends of the shanks 23. A shoe 24, made of a suitable frictional material, such as leather, is provided on the face of the head 22 and is adapted to engage the friction member 17 to lock the driven member to the driving member.

The inner end portions of the bent levers 27 are engaged by an annular member 28′ to be actuated in unison thereby. The annular member 28′ is provided with a flange 29 adapted to engage the inner ends of the bent levers 27 to maintain the annular member 28′ in proper relation with said bent levers. A sleeve 30 is rotatively and slidably mounted on a cap 31 and provided with a flange 32 which is connected with the annular member 28′ by means of a ball bearing 33 to actuate said bent levers. The cap 31 is provided with pins 34 which engage diagonal slots 35 in the sleeve 30 to cause longitudinal movement of said sleeve on said cap upon rotation of the former. The sleeve 30 is rotated by means of a suitable arm 36 and the cap 31 is secured against rotation by means of an arm 37 which latter is secured to the frame of the motor cycle. The cap 31 is provided with an oblong perforation 38 at its center adapted to pass over the spindle 11.

The lever 36 is connected to manually operative means in a suitable connecting means, not shown, to cause manual operation thereof.

The friction member 17 is provided with threaded ears 39 to which is secured a plate 40 which effectively covers the driven mechanism. The plate 40 is provided with a perforation 41 through which adjustment or replenishing the shoes 24 may be effected without removing the plate 40. A door 42 is secured in the opening 41 by means of screws 43 as is clearly illustrated.

In operation, lever 37 is secured to the cycle frame to prevent rotation of the cap 31. The lever 36 is connected to manually operative means. Rotation of the arm 36 causes rotation of the sleeve 30 and upon rotation of the sleeve 30 the pins 34 and slots 35 cause corresponding longitudinal movement of the sleeve 30 and flange 32 which moves the annular member 28′ to cause swinging of all of the bent levers 27 on their floating pivotal connection, recesses 25 and projections 26. The arms 28 of the bent levers rest on the portions 21 and upon moving of the inner ends of the bent levers cause longitudinal movement of the heads 22, shanks 23 and friction member 24 causing the friction member 24 to engage the friction member 17 to lock the driven member to the driving member. To effect releasing of the clutch mechanism the lever 36 is caused to be moved in the opposite direction by any suitable means whereupon the rotating driving member 17 forces the friction member 24, heads 22 and shanks 23 inwardly toward the axis of the clutch mechanism to release the clutch.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a driving member; a driven member; guides carried by one of said members; shoes slidably mounted in said guides and adapted to engage the other of said members; bent levers, each having one of its arms fulcrumed on a portion of one of said guides and its bent portion operatively engaging one of said shoes; and manually operative means connecting the other arms of said bent levers for simultaneous operation thereof, substantially as described.

2. In combination, a driving member; a driven member; a plurality of substantially U-shaped guides carried by one of said members, each guide having a perforation in its bight portion; frictional clutch shoes slidably mounted between the legs of said U-shaped guides and provided with shanks slidably mounted in said perforations; bent levers, each having one of its arms fulcrumed on one of said guides and its bent portion engaging one of said shanks; and means connected with each of the other arms of said bent levers for simultaneous operation thereof, substantially as described.

3. In combination, a driving member; a driven member; a plurality of substantially U-shaped guides carried by one of said members, each of said guides having a perforation in its bight portion; frictional clutch shoes slidably mounted between the legs of said U-shaped guides and provided with shanks slidably mounted in said perforations; bent levers, each having one of its arms fulcrumed on one of said guides and its bent portion engaging one of said shanks; a member connecting the other arm of each of said bent levers for simultaneous operation of the latter; and means adapted to cause operation of said levers, substantially as described.

4. In combination, a driving member; a driven member; a plurality of U-shaped guides carried by said driven member, each of said guides having a perforation in its bight portion; clutch shoes slidably mounted between the legs of said U-shaped guides and having shanks slidably mounted in said perforations, each of said shanks being slotted and having a recess at the inner end of said slot; L-shaped levers in said slots and extending through said perforations, one arm of each lever being fulcrumed on one of said guides and the other arm thereof extending toward the axis of said driven member; a projection on each of said L-shaped levers and extending into one of said recesses; and an annular member engaging corresponding arms of said L-shaped levers, substantially as described.

5. In combination, a driving member; a driven member; a plurality of U-shaped guides carried by said driven member, each of said guides having a perforation in its bight portion; clutch shoes slidably mounted between the legs of said U-shaped guides and having shanks slidably mounted in said perforations, each of said shanks being slotted and having a recess at the inner end of said slot; L-shaped levers in said slots and extending through said perforations, one arm of each of said levers engaging the bight portion of its corresponding guide and the other arm of each of said levers extending toward the axis of said driven member; a projection at the angular portion of each of said L-shaped levers and extending into one of said recesses; an annular member engaging the arms of said L-shaped levers which extend toward the axis of said driven member; and a longitudinally moving sleeve operatively engaging said annular member, substantially as described.

In testimony whereof I have signed my name to this specification in the presence of two subscribing witnesses.

CHARLES FLOYD HURLBUT.

Witnesses:
HELEN F. LILLIS,
JOSHUA R. H. POTTS.

Copies of this patent may be obtained for five cents each, by addressing the "Commissioner of Patents, Washington, D. C."